(12) United States Patent
Mustakangas et al.

(10) Patent No.: US 12,508,524 B2
(45) Date of Patent: Dec. 30, 2025

(54) FILTER PLATE ASSEMBLY FOR A FILTER PRESS, AND SUCH A FILTER PRESS

(71) Applicant: Metso Finland Oy, Espoo (FI)

(72) Inventors: Mirva Mustakangas, Pirkkala (FI); Janne Kaipainen, Halsua (FI); Ismo Juvonen, Rauha (FI); Teemu Eloranta, Luumaki (FI)

(73) Assignee: METSO FINLAND OY, Espoo (FI)

( * ) Notice: Subject to any disclaimer, the term of this patent is extended or adjusted under 35 U.S.C. 154(b) by 311 days.

(21) Appl. No.: 18/262,670

(22) PCT Filed: Feb. 2, 2022

(86) PCT No.: PCT/FI2022/050062
§ 371 (c)(1),
(2) Date: Jul. 24, 2023

(87) PCT Pub. No.: WO2022/167723
PCT Pub. Date: Aug. 11, 2022

(65) Prior Publication Data
US 2024/0109007 A1     Apr. 4, 2024

(30) Foreign Application Priority Data
Feb. 3, 2021  (EP) ..................... 21154955

(51) Int. Cl.
*B01D 25/21* (2006.01)
*B01D 25/164* (2006.01)
*B01D 25/28* (2006.01)

(52) U.S. Cl.
CPC ......... *B01D 25/215* (2013.01); *B01D 25/164* (2013.01); *B01D 25/285* (2013.01); *B01D 2201/34* (2013.01)

(58) Field of Classification Search
CPC .. B01D 25/215; B01D 25/164; B01D 25/285; B01D 25/12; B01D 2201/34
See application file for complete search history.

(56) References Cited

U.S. PATENT DOCUMENTS

| 3,656,622 A * | 4/1972 | Heimbach ............ B01D 25/215 |
| | | 210/231 |
| 4,948,501 A | 8/1990 | Klinkau et al. |
| 2015/0108072 A1* | 4/2015 | Bohnke ................ B01D 25/164 |
| | | 210/797 |

FOREIGN PATENT DOCUMENTS

| FR | 2720658 A1 * | 12/1995 | ........... B01D 25/215 |
| GB | 2069360 A | 8/1981 | |
| GB | 2233578 A | 1/1991 | |

OTHER PUBLICATIONS

International Search Report and Written Opinion for International Application No. PCT/FI2022/050062, mailed Feb. 28, 2022.

* cited by examiner

*Primary Examiner* — Liam Royce
(74) *Attorney, Agent, or Firm* — Andrus Intellectual Property Law, LLP

(57) ABSTRACT

A filter plate assembly for a filter press, comprising a filter frame and a filter plate supported on the filter frame. A diaphragm is provided between the filter frame and the filter plate, the diaphragm further comprising, on a side facing the filter frame, a seal bead for sealing the diaphragm against the filter plate. The seal bead comprises a first seal lip and a second seal lip, the former being elevated from the later. The filter frame has a limited vertical travel with respect to the filter plate, such that, in a lowermost position, only the first seal lip is in contact with the filter plate, and in an uppermost position, both the first seal lip and the second seal lip are in contact with the filter plate.

15 Claims, 5 Drawing Sheets

FILTER PLATE ASSEMBLY FOR A FILTER PRESS, AND SUCH A FILTER PRESS

CROSS-REFERENCE TO RELATED APPLICATIONS

This application is the U.S. national stage application of International Application PCT/FI2022/050062, filed Feb. 2, 2022, which international application was published on Aug. 11, 2022, as International Publication WO 2022/167723 A1 in the English language. The International Application claims priority to European Patent Application No. 21154955.5, filed Feb. 3, 2021.

FIELD OF THE DISCLOSURE

The present disclosure relates to filter presses, such as a tower press, equipped with a diaphragm for squeezing remaining liquid content out of a filter cake. The present disclosure further concerns a filter plate assembly for such a filter press.

BACKGROUND OF THE DISCLOSURE

In filter presses, particularly horizontal filter presses such as tower presses, a horizontally extending filter chamber is formed between adjacent filter plate assemblies, comprising a filter frame and a filter plate, in which assemblies a filter diaphragm is also provided. The diaphragm is typically attached to the filter frame at the periphery thereof, and is clamped against the filter plate so as to seal a space known as a diaphragm chamber formed between the filter diaphragm and the filter plate.

When in use, the diaphragm chamber may be provided with a pressurized medium to push the diaphragm against a filter cake formed in the filter chamber and to squeeze remaining liquid contents from the filter cake. Moreover, an underpressurized medium may be provided within the space between the filter diaphragm and the filter plate when adjacent filter frame assemblies are space apart from each other (i.e. the filter chamber is opened) during filter cake removal. This is done to prevent the filter diaphragm from hanging out in the space between the adjacent filter frame assemblies in the way of the filter cake being discharged.

However, improper use or a malfunction of the filter apparatus may cause a pressurized medium to be introduced between the diaphragm and the plate when the adjacent frame assemblies are spaced apart from each other. This may further lead to the filter diaphragm excessively inflating into the space between the spaced apart adjacent filter plate assemblies which, in turn, may cause damage to the filter diaphragm, or even a catastrophic failure thereof.

BRIEF DESCRIPTION OF THE DISCLOSURE

An object of the present disclosure is to provide a filter plate assembly having a diaphragm for squeezing remaining liquid contents out of a filter cake, while preventing accidental overpressurization of the diaphragm chamber (i.e. the space between the filter diaphragm and the filter plate), when adjacent filter plate assemblies are spaced apart (i.e. when an associated filter chamber is open, and additionally allowing the filter diaphragm to be held up by an underpressure introduced into the diaphragm chamber, so as facilitate discharge of the filter cake.

It is a further object of the present disclosure to provide a filter press incorporating such a filter plate assembly.

The objects of the disclosure are achieved by the filter plate assembly and the filter press. which are characterized by what is stated in the independent claims. The preferred embodiments of the disclosure are disclosed in the dependent claims.

The present disclosure is based on the idea of providing a filter plate arranged on a filter frame, such that a limited vertical travel between the filter frame and the filter plate is achieved. Moreover, a diaphragm is provided therebetween with a seal bead having a first seal lip and a second lip, the former being elevated from the latter.

Particularly, a tight seal that is able to withstand pressures exerted within a diaphragm chamber, so as to squeeze remaining liquid contents out of a filter cake with the diaphragm, is achieved between the diaphragm and the filter plate when the filter frame is in the uppermost position of the vertical travel (i.e., when the filter chamber is closed during filtration), such that both the first and second seal lip are in tight contact with the filter plate.

Moreover, when filter frame is in a lowermost position of its limited travel (i.e. when the filter chamber is opened for cake discharge, for example), the second seal lip is allowed to disengage from contact with the filter plate. This prevents accidental overpressurization of the diaphragm chamber when the filter chamber is open. Such an overpressurization could potentially lead to damage of the diaphragm and/or filter plate assembly, or even catastrophic failure thereof. Simultaneously, the first seal lip remaining in contact with the filter plate, even when the filter frame is in the lowermost position, allows holding the diaphragm up by providing an underpressurized medium into diaphragm chamber. That is, the first seal lip, on its own, is configured to provide sealing against a sufficient underpressure required to hold the diaphragm up so as to facilitate discharge of the filter cake. At the same time, the first seal lip is configured to leak against an overpressure sufficiently high to cause damage to the diaphragm or the filter plate assembly, thus preventing accidental overpressurization of the diaphragm chamber when the filter chamber is opened.

According to a first aspect of the present disclosure, a filter plate assembly for filter press is provided. Advantageously, the associated filter press is a horizontal filter press defined by horizontally aligned filter plates and filter chambers, such as a tower press.

The filter plate assembly comprises a filter frame defining a closed perimeter delimiting an open space, and a filter plate supported on the filter frame such that the filter plate extends over the open space.

A retainer groove is provided on a side of the filter frame facing the filter plate. Most suitably, the retainer groove extends around the perimeter of the filter frame, preferably in a continuous manner.

The filter plate assembly further comprises a diaphragm extending over the open space, and attached to the filter plate assembly, between the filter frame and the filter plate. Most suitably, the diaphragm has a sheet-like body with a flexible structure. That is, the diaphragm should be able to yield sufficiently so as to deform under pressure resulting in a filter cake being squeezed, when in use.

The diaphragm further comprises, on a side facing the filter frame, a seal bead for sealing the diaphragm against the filter plate. Most suitably, the seal bead runs along a perimeter of the diaphragm or at a distance therefrom, preferably in a continuous manner. That is, the seal bead may be provided as a continuous bead, or as a plurality of discrete bead portions forming a continuous bead. The diaphragm further comprises, on a side facing the filter plate, a retainer bead received within the retainer groove, such that the diaphragm is retained in position between the filter frame and the filter plate. Most suitably, the retainer bead runs along the perimeter of the diaphragm or at a distance therefrom, preferably in a continuous manner. That is, the retainer bead may be provided as a continuous bead, or as a plurality of discrete bead portions forming a continuous bead.

The filter frame forms a lateral wall of a filter chamber, when in use. Most suitably, the filter frame acts as a load-bearing element against lateral components of filtration forces caused by a filtration pressure prevailing in said chamber.

Furthermore, the seal bead comprises a first seal lip and a second seal lip, such that wherein the first seal lip is vertically elevated from the second seal lip. Most suitably, the first and second seal lips run parallel with respect to, and laterally spaced apart from each other.

The filter plate is arranged on the filter frame so as to allow a limited vertical travel of the filter frame with respect to the filter plate, such that the filter frame has a lowermost position and an uppermost position. In the lowermost position, only the first seal lip is in contact with the filter plate, whereas in the uppermost position, both the first seal lip and the second seal lip are in contact with the filter plate.

In an embodiment according to the first aspect of the present disclosure, a diaphragm chamber is formed between the filter plate and the diaphragm, on an inside of the seal bead. The filter plate assembly is configured such that, when the filter frame is in the lowermost position, the first seal lip seals against a first pressure differential corresponding to a situation in which the diaphragm chamber is under-pressurized with respect to environmental pressure, so as to hold the diaphragm up. The filter plate assembly is simultaneously further configured such that the first seal lip leaks under a second pressure differential corresponding to a situation in which the diaphragm chamber is over-pressurized with respect to environmental pressure, so as to inflate the diaphragm.

In such case, the absolute value of the first pressure differential is less than that of the second pressure differential.

In a further embodiment according to the second aspect of the present disclosure, the first seal lip is positioned laterally outside the second seal lip, and correspondingly, the second seal lip is arranged laterally inside the first seal lip.

Preferably, but not necessarily, the outer seal lip is configured to deform outwardly away from the filter plate-facing side of the diaphragm when a pressure is exerted thereon from a lateral outside, and to deform inwardly towards the filter plate-facing side of the diaphragm, when a pressure is exerted thereon from a lateral inside. Furthermore, the inner seal lip is configured to deform outwardly away from the filter plate-facing side of the diaphragm when a pressure is exerted thereon from a lateral inside, and to deform inwardly towards the filter plate-facing side of the diaphragm, when a pressure is exerted thereon from a lateral outside.

Preferably, but not necessarily, the outer seal lip has a first asymmetric lateral rigidity, and the inner seal leap has a second asymmetric lateral rigidity. In such a case the inner seal lip has an increased lateral rigidity against a pressure exerted from the lateral inside with respect to a transversal rigidity of the inner seal lip against a pressure exerted from the lateral outside. Correspondingly, the outer seal lip has an increased lateral rigidity against a pressure exerted from a lateral outside with respect to a transversal rigidity of the outer seal lip against a pressure exerted from a lateral inside.

Preferably, but not necessarily, the cross-sectional profile of the outer seal lip defines an outer seal lip ridge between a lateral outside crest and a lateral intermediate crest, and the cross-sectional profile of the inner seal lip defines an inner seal lip ridge between a lateral inside crest and the lateral intermediate crest.

In such a case, a portion of the cross-sectional profile of the inner seal lip, residing on the lateral outside of a vertical line running through a lateral centre point of the inner seal lip ridge along the direction perpendicular to the general plane of the diaphragm, advantageously occupies a greater space than a portion of the cross-sectional profile of the inner seal lip residing on the lateral inside of said line. Correspondingly, a portion of the cross-sectional profile of the outer seal lip, residing on the lateral inside of a vertical line running through a lateral centre point of the outer seal lip ridge along the direction perpendicular to the general plane of the diaphragm, advantageously occupies a greater space than a portion of the outer seal lip residing on the lateral outside of said line.

Alternatively, or in addition, the cross-sectional profile of the outer seal lip may have a greater inclination between the lateral outside crest and the outer seal lip ridge than between the lateral intermediate crest and the outer seal lip ridge. Moreover, the cross-sectional profile of the inner seal lip may have a greater inclination between the lateral inside crest and the inner seal lip ridge than between the lateral intermediate crest and the inner seal lip ridge.

Alternatively, or in addition, an inclination at which a lateral outside wall of the outer seal lip adjoins the ridge thereof may be greater than an inclination at which a lateral inside wall of the outer seal lip adjoins the ridge thereof. Moreover, an inclination at which a lateral inside wall of the inner seal lip adjoins the ridge thereof may be greater than an inclination at which a lateral outside wall of the inner seal lip adjoins the ridge thereof.

Alternatively, or in addition, the outer seal lip may have a first height extending from the lateral intermediate crest outwardly from the filter plate-facing side of the diaphragm in the direction perpendicular to the general plane of the diaphragm. Correspondingly, the inner seal lip may have a second height extending from the lateral intermediate crest outwardly from the filter plate-facing side of the diaphragm in the direction perpendicular to the general plane of the diaphragm. Particularly, the first height is preferably at least 10% greater than the second height.

Alternatively, or in addition, the outer seal lip may have a first height extending from the lateral intermediate crest outwardly from the filter plate-facing side of the diaphragm in the direction perpendicular to the general plane of the diaphragm. Correspondingly, the inner seal lip may have a second height extending from the lateral intermediate crest outwardly from the filter plate-facing side of the diaphragm in the direction perpendicular to the general plane of the diaphragm. Particularly, the second height is preferably at least 30% of the first height.

In a further embodiment according to the first aspect of the present disclosure, filter plate assembly comprises a plurality of pins protruding from the filter plate through openings provided in the filter frame. Suitably, such pins are parallel with the limited travel of the filter frame, and at least one pin is provided with a stopper at a distal end thereof for limiting the lowermost position of the filter frame. Such a stopper is provided at a suitable distance from the filter plate, for allowing a desired limited vertical travel of the filter frame.

Preferably, but not necessarily, the at least a pin provided with a stopper is equipped with a male thread at a distal end thereof. In such a case, the stopper is suitably threadedly engaged with the pin. For example, the stud having the at least a stopper may be provided as a bolt or a stud bolt, whereas the stopper may be provided as a nut.

Preferably, but not necessarily, the pin equipped with the stopper is also equipped with a sleeve provided between the stopper and the filter plate. Such a sleeve 1 protrudes through an opening of the filter frame corresponding to the associated pin. Furthermore, the limited travel of the filter frame extends along the sleeve. Suitably, such a sleeve may be provided integrally with the stopper. Such a sleeve may alternatively be provided as a separate component fixed between the stopper and the filter plate, so as to surround the associated pin.

Moreover, pins without an associated stopper, may also be provided for further guiding the filter frame along the limited travel. Such additional pins are also provided protruding from the filter plate, extending parallel with the limited travel of the filter frame and through openings provided in the filter frame.

It should be noted that the first aspect of the present disclosure encompasses any combination of two or more embodiments, or variants thereof, as discussed above.

According to a second aspect of the present disclosure, a filter press is provided. Particularly, the filter press comprises a plurality of filter plate assemblies according to the first aspect of the present disclosure.

In an embodiment according to the second aspect of the present disclosure, the filter press comprises a plurality of filter plates configured movable towards each other into a closed position in which a filter chamber is formed by adjacent filter plate assemblies, and away from each to an open position in which adjacent filter plates are spaced apart from each other. A translation arrangement is provided for moving the filter plates towards each other so as to form a filter chamber, and away from each other so as to open the filter chamber.

The filter press further comprises a filter medium arranged between adjacent filter plate assemblies, a feed arrangement for feeding slurry into the filter chamber and a discharge arrangement for discharging a filter cake formed within the filter chamber.

Particularly, one or more filter plates are equipped with a filtrate vat, such that filtrate is received by the filtrate vat from an adjacent filter chamber.

Moreover, the filter press may be provided as a horizontal filter press, such as a tower press. That is, the filter plate may be provided in a horizontally extending configuration. However, the filter plates may alternatively be provided in a vertically extending configuration.

It should be noted that the second aspect of the present disclosure encompasses any combination of two or more embodiments, or variants thereof, as discussed above.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
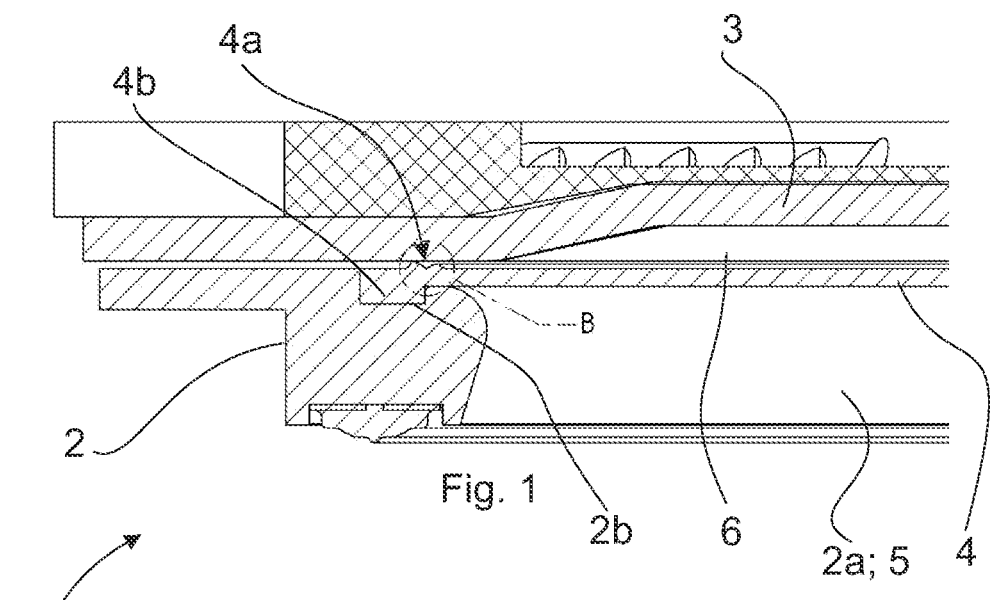
FIG. 1 illustrates a filter plate assembly according to an embodiment of the present disclosure, as seen as a partial cut view from a lateral side of the filter plate assembly.

In FIG. 1, a filter plate assembly 1 according to an embodiment of the present disclosure is shown as a partial cut view seen from a lateral side thereof. A filter plate 3 is supported on a filter frame 2, such that the plate 3 covers an open space 2a laterally delimited by a closed perimeter formed by the filter frame 2. The filter frame both supports the filter plate 3 and acts as a load bearing member against lateral forces prevailing within the open space 2a during operation. The filter plate 2 is coupled to the filter plate 3 with a limited vertical travel, as discussed in more detail below.

A diaphragm 4, also extending over the open space 2a, is provided between the filter frame 2 and the filter plate 3, such that a diaphragm chamber 6 (i.e. a space between the diaphragm 4 and the filter plate 3) is formed. The diaphragm is provided with a retaining bead 4b extending around the perimeter of the diaphragm 4, on a side thereof facing the filter frame 2. The retaining bead 4b is received within a corresponding retaining groove 2b formed on the filter frame 2 extending around the open space 2a, on a side of the filter frame 2 facing the filter plate 3. The diaphragm is further provided with a sealing bead 4a extending around the perimeter of the diaphragm, at a distance therefrom, on a side of the diaphragm 4 facing the filter plate 3. That is, the sealing bead 4a seals the interphase between the diaphragm 4 and the filter plate 3 surrounding the diaphragm chamber 6.

Figure 2:
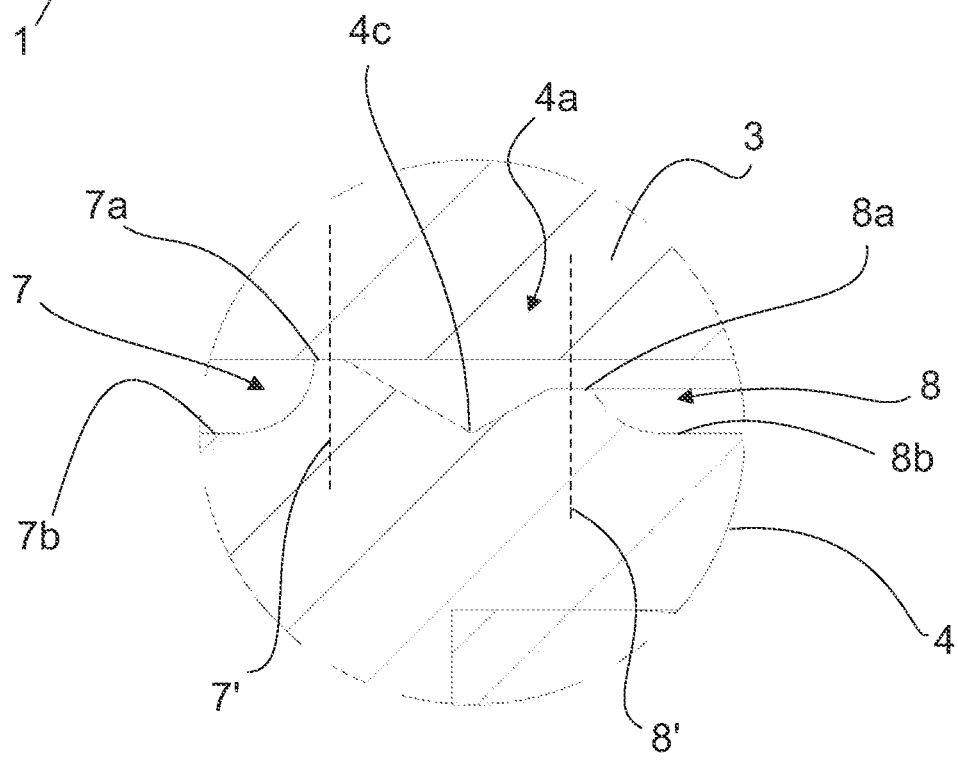
FIG. 2 illustrates a detailed view of a diaphragm seal bead of FIG. 1.

FIG. 2 shows a detailed view of a diaphragm seal bead of FIG. 1. Particularly, the seal bead 4 has a first seal lip 7 and a second seal lip 8, the first seal lip 7 being elevated from the second seal lip. Particularly, FIG. 2 schematically represent a situation in which the filter frame 2 is in the lowermost position, and only the first seal lip 7 is contact with the filter plate 3. This, together with the limited vertical travel of the filter frame 2, allows that both the first and second seal lips 7, 8 are in contact with the filter frame, when the filter frame 2 is in the uppermost position, and that only the first seal lip 7 is in contact with the filter plate 3, when the filter frame 2 is in the lowermost position.

Particularly, in the embodiment shown in drawings, the first seal lip 7 is positioned laterally outside the second seal lip 8, and correspondingly, the second seal lip 8 is arranged laterally inside the first seal lip.

Moreover, the outer seal lip 7 has a form and shape configured to deform outwardly away from the filter plate-facing side of the diaphragm 4 when a pressure is exerted thereon from a lateral outside, and to deform inwardly towards the filter plate-facing side of the diaphragm 4, when a pressure is exerted thereon from a lateral inside. Correspondingly, the inner seal lip 8 is configured to deform outwardly away from the filter plate-facing side of the diaphragm 4 when a pressure is exerted thereon from a lateral inside, and to deform inwardly towards the filter plate-facing side of the diaphragm 4, when a pressure is exerted thereon from a lateral outside.

Furthermore, the shape and form of the outer seal lip 7 and the inner seal lip 8 are configured such that the outer seal lip 7 exhibits a first asymmetric lateral rigidity, and the inner seal lip 8 exhibits a second asymmetric lateral rigidity. The inner seal lip 8 is able to better resist deformation against a pressure exerted from the lateral inside than against a pressure exerted from the lateral outside. Correspondingly, the outer seal lip 7 is able to better resist deformation against a pressure exerted from a lateral outside than against a pressure exerted from a lateral inside.

Particularly, in the configuration of FIG. 2, the cross-sectional profile of the outer seal lip 7 defines an outer seal lip ridge 7a between a lateral outside crest 7b and a lateral intermediate crest 4c, and the cross-sectional profile of the inner seal lip 8 defines an inner seal lip ridge 8a between a lateral inside crest 8b and the lateral intermediate crest 4c. In other words, the outer seal lip 7 and the inner seal lip 8 are elevated from the surrounding area of the diaphragm, and an intermediate crest 4c is formed therebetween.

Moreover, a portion of the cross-sectional profile of the inner seal lip 8, residing on the lateral outside of a vertical line 8' running through a lateral centre point of the inner seal lip ridge 8a along the direction perpendicular to the general plane of the diaphragm 4 (i.e. along a vertical direction), occupies a greater space than a portion of the cross-sectional profile of the inner seal lip 8 residing on the lateral inside of said line 8'. Correspondingly, a portion of the cross-sectional profile of the outer seal lip 7, residing on the lateral inside of a vertical line 7' running through a lateral centre point of the outer seal lip ridge 7a along the direction perpendicular to the general plane of the diaphragm 4, occupies a greater space than a portion of the outer seal lip 7 residing on the lateral outside of said line 7'. That is, a greater portion of the outer seal lip 7 resides on a lateral inside thereof, enabling the outer seal lip 7 to better resist deformation against a pressure exerted from the lateral outside, and a greater portion of the inner seal lip 8 resides on a lateral outside thereof, enabling the inner seal lip 8 to better resist deformation against a pressure exerted from the lateral inside.

Moreover, the configuration of FIG. 2 shows that the cross-sectional profile of the outer seal lip 7 has a greater inclination between the lateral outside crest 7b and the outer seal lip ridge 7a than between the lateral intermediate crest 4c and the outer seal lip ridge 7a. Correspondingly the cross-sectional profile of the inner seal lip 8 has a greater inclination between the lateral inside crest 8b and the inner seal lip ridge 8a than between the lateral intermediate crest 4c and the inner seal lip ridge 8a. Such shape and form of the seal lips 7, 8 further improve the intended characteristics under different pressure scenarios, as discussed above.

FIG. 2 also shows an inclination at which a lateral outside wall of the outer seal lip 7 adjoins the ridge 7a thereof being greater than an inclination at which a lateral inside wall of the outer seal lip 7 adjoins the ridge 7a thereof. Similarly, an inclination at which a lateral inside wall of the inner seal lip 8 adjoins the ridge 8a thereof is greater than an inclination at which a lateral outside wall of the inner seal lip 8 adjoins the ridge 8a thereof. Again, such shape and form of the seal lips 7, 8 further improve the intended characteristics under different pressure scenarios, as discussed above.

Figure 3:
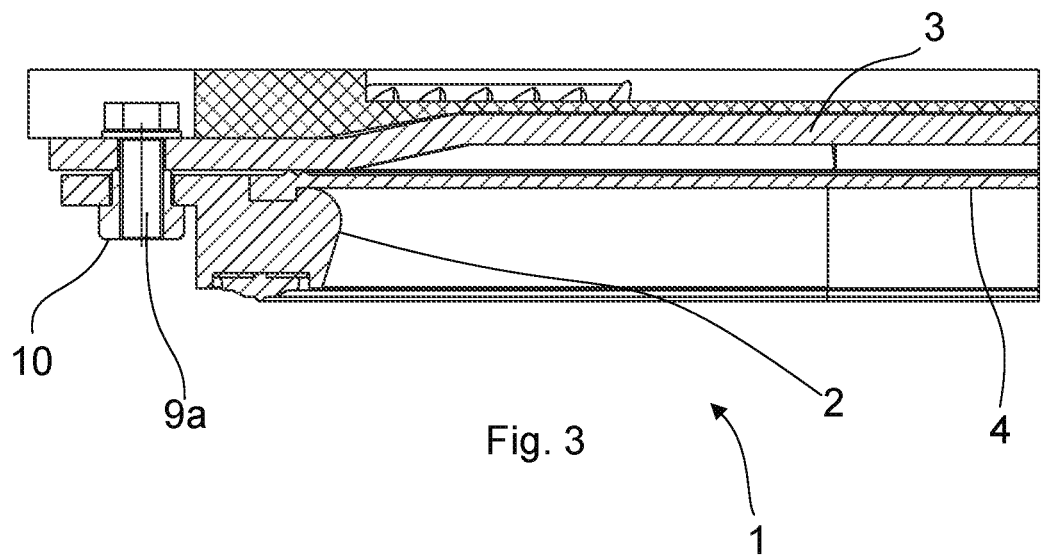
FIG. 3 illustrates a filter plate assembly according to an embodiment of the present disclosure having a filter frame in a lowermost position thereof, as seen as a partial cut view from a lateral side of the filter plate assembly, at a point corresponding to a pin equipped with a stopper.

FIG. 3 illustrates a filter plate assembly similar to that of FIG. 1, as seen as a partial cut view from a lateral side of the filter plate assembly, at a point corresponding to a pin 9a equipped with a stopper 10. Particularly, FIG. 3 illustrates the filter frame 2 being in a lowermost position of its limited vertical travel. This lowermost position corresponds to a situation, in which filter chambers of the associated filter press are opened by retracted adjacent filter plates away from each other. Moreover, a pin 9a extends from the filter plate 3 through a hole 2c provided in the filter frame. The pin 9a is provided with a stopper 10 at distal end thereof, the stopper 10 having a flange with diameter larger than that of the hole 2c on the frame 2. Furthermore, the stopper 10 is provided at a distance from the filter plate 3 allowing a desired limited vertical travel for the filter frame 2, while preventing it from falling away from the filter plate 3.

Figure 4:
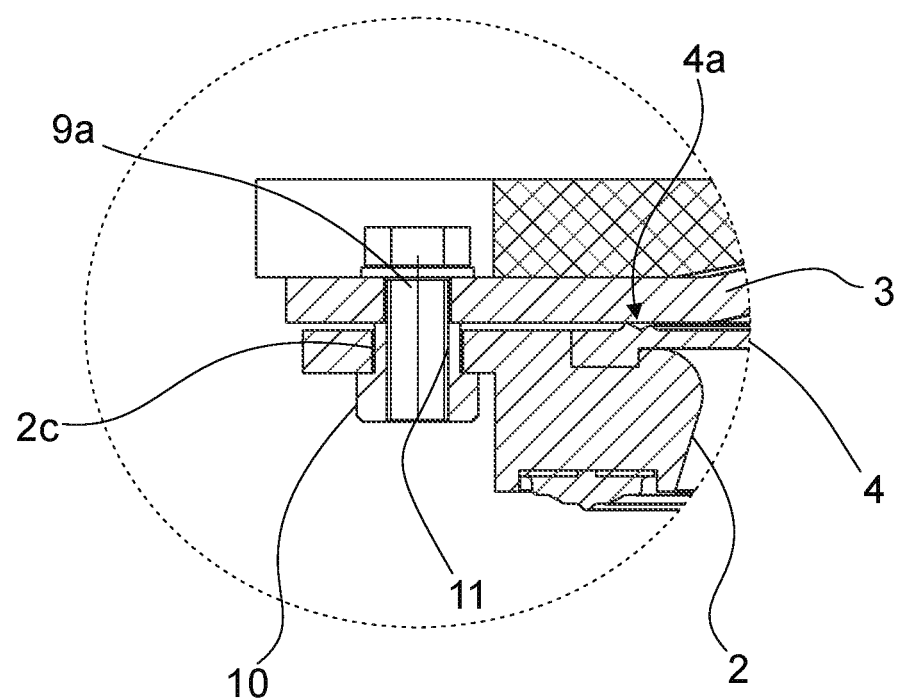
FIG. 4 illustrates a detailed view of FIG. 3.

FIG. 4 shows the pin 9a and stopper 10 of FIG. 3 in more detail. Particularly, the pin 9a extends through an associated hole 2c of the filter frame 2. An integral sleeve 11 is provided in connection with the stopper 10, extending between the stopper 10 and the filter plate 3. The sleeve 11 resides within the hole 2c, thereby provides a sliding surface along which the filter frame 2 can move in its limited vertical travel. In addition, FIG. 4 illustrates a gap formed between the filter frame 2 and the filter plate 3.

Figure 5:
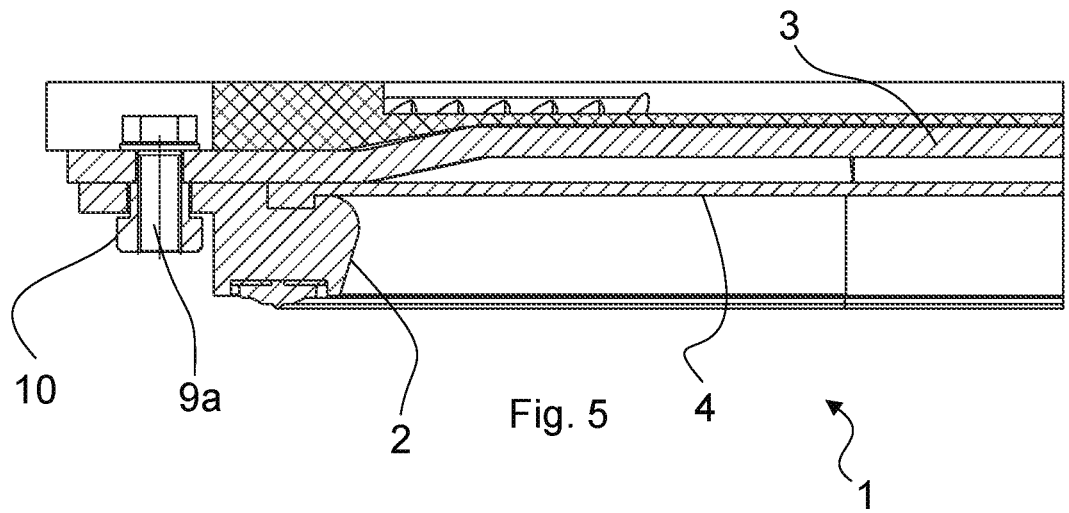
FIG. 5 illustrates a filter plate assembly according to an embodiment of the present disclosure having a filter frame in an uppermost position thereof, as seen as a partial cut view from a lateral side of the filter plate assembly, at a point corresponding to a pin equipped with a stopper.
Figure 6:
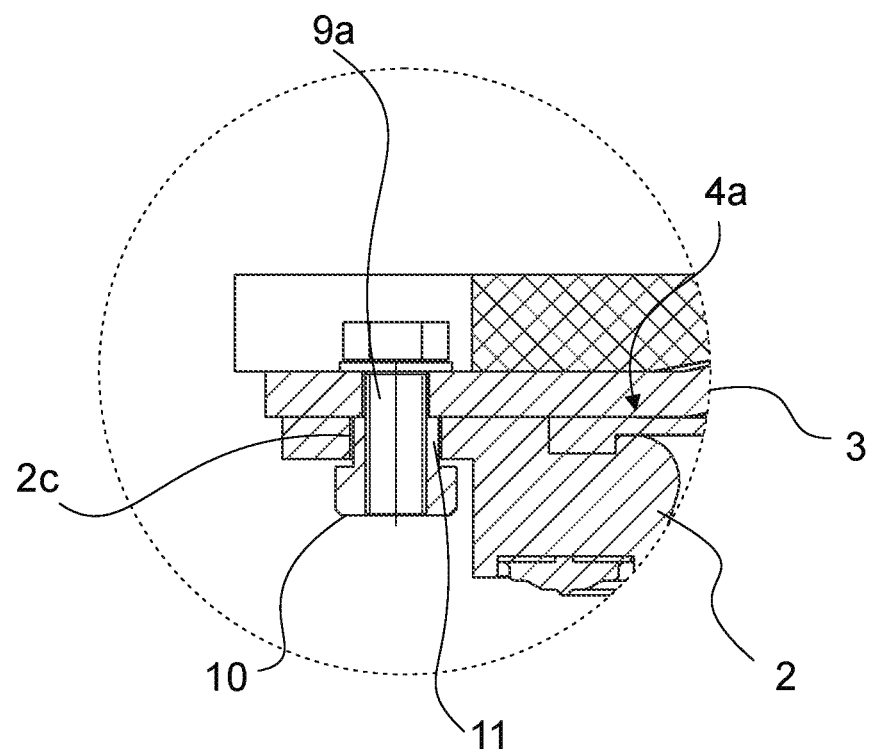
FIG. 6 illustrates a detailed view of FIG. 5.

FIG. 5 and FIG. 6, in turn, illustrate the filter frame assembly in view similar to those of FIG. 3 and FIG. 4, in a situation having the filter frame 2 in its uppermost position. This uppermost position corresponds to a situation, in which filter chambers of the associated filter press are closed by pressing adjacent filter plates towards each other. Moreover, as the filter frame 2 is in the uppermost position, a gap corresponding to the limited vertical travel of the frame 2 is formed between a stopper surface of the stopper 10 and the surface of the frame 2 surrounding the opening 2c.

Figure 7:
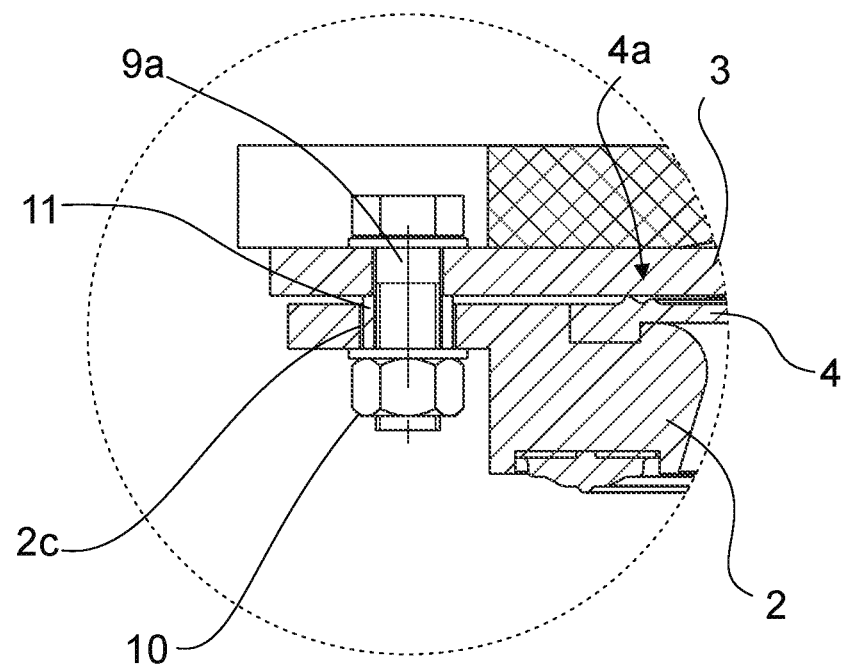
FIG. 7 illustrates a detailed view similar to FIG. 4, equipped with an alternative stopper configuration.
Figure 8:
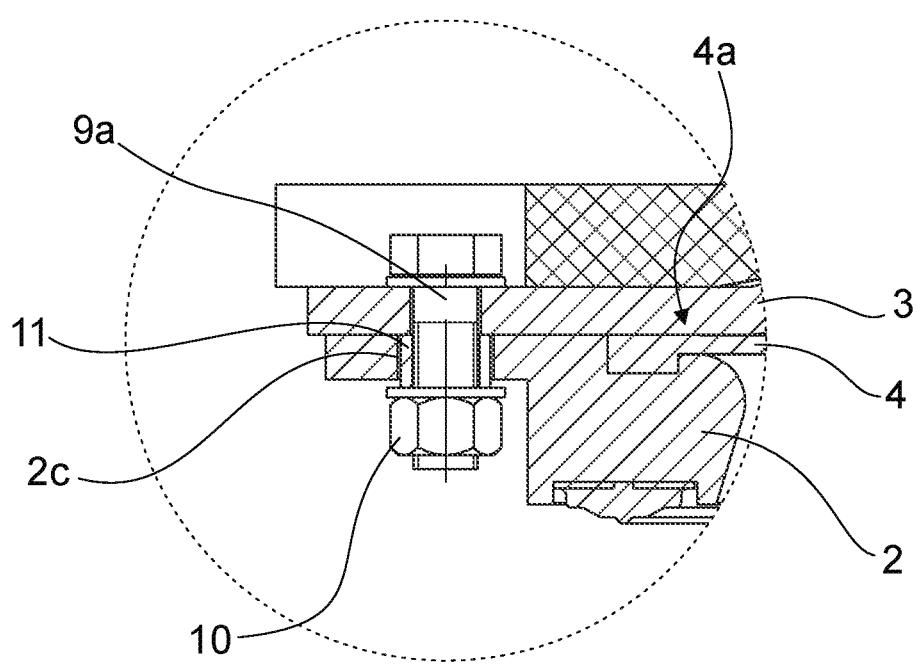
FIG. 8 illustrates a detailed view similar to FIG. 6, equipped with an alternative stopper configuration.

FIG. 7 and FIG. 8 illustrate arrangements similar to those shown in FIG. 4 and FIG. 6, with the exception that the stopper 10 and the sleeve 11 are provided as separate components. Particularly, FIG. 7 and FIG. 8 show an embodiment, where the stopper 10 is provided as a nut threaded onto the pin 9a, whereas the sleeve 11 is provided as bushing inserted overt the stud 9a between the stopper 1 and the filter plate 3.

In the embodiments of FIG. 3-FIG. 8, the pin 9a is provided as a bolt extending through the filter plate 3. However, other implementations are also possible. For example, the pin 9a may alternatively be provided as stud bolt extending through the filter plate 3, or as a stud fixed to the filter plate 3.

Figure 9:
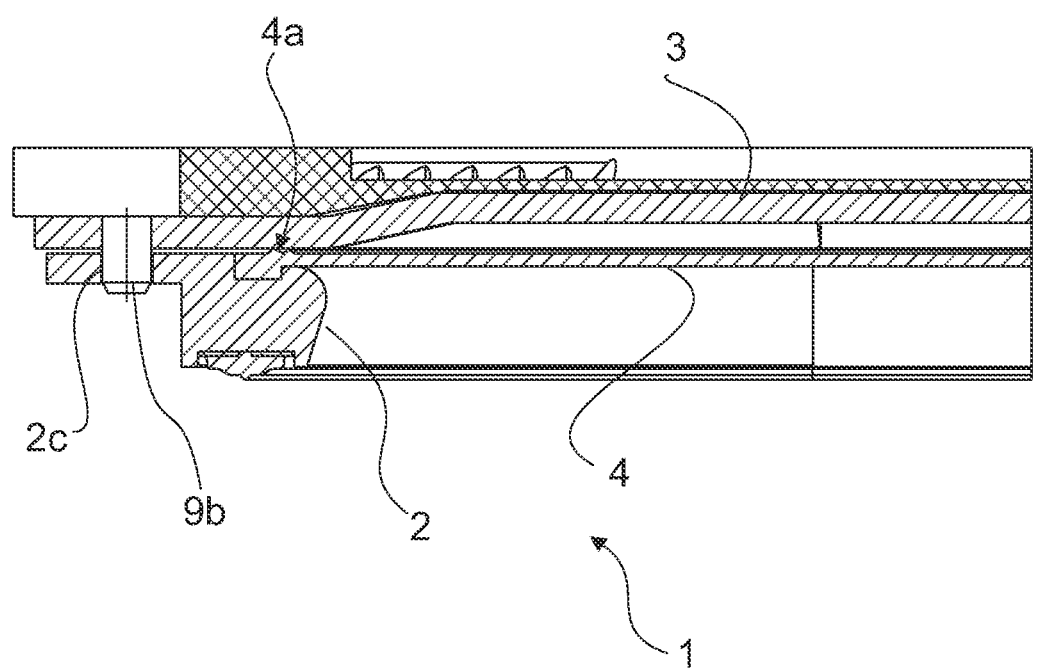
FIG. 9 illustrates a filter plate assembly according to an embodiment of the present disclosure having a filter frame in a lowermost position thereof, as seen as a partial cut view from a lateral side of the filter plate assembly, at a point corresponding to a pin not equipped with a stopper.

FIG. 9, in turn, illustrates a filter plate assembly 1 according to an embodiment of the present disclosure having a filter frame 2 in a lowermost position thereof, as seen as a partial cut view from a lateral side of the filter plate assembly 1, at a point corresponding to a pin 9b not equipped with a stopper. Particularly, such pins 9b without a stopper can be used in addition to pins 9a equipped with stoppers to further guide the filter frame 2 along its limited vertical travel. This ensures, that proper lateral alignment is maintained.

When in use, superimposed filter plate assemblies are pressed against each other, such that a filter medium (not shown) resides between two such adjacent filter plate assemblies. A filter chamber 5 is thereby formed within the open space 2a, delimited laterally within the frame 2, and vertically between the diaphragm 4 and the filter medium (not shown) residing between said adjacent, superimposed filter plate assemblies (adjacent filter plate assembly not shown). That is, during operation pressurized slurry is fed into the filter chamber 5, and the liquid contents thereof (i.e. filtrate) permeates through a filtrate medium (not shown) onto a filtrate vat provided on a filter plate of a filter plate assembly below the filter chamber. The solid contents remain within the filter chamber 5 thereby forming a solids deposition known as a filter cake. Residual liquid contents may then be further extracted from the filter cake by introducing a pressurized medium into the diaphragm chamber 6. This results in the diaphragm 4 deforming towards the filter chamber 5, thereby squeezing remaining liquid contents from the filter cake. The filter cake is subsequently removed from the filter chamber 5 by retracting the filter plate assemblies away from each other (i.e. opening the filter chamber 5) and advancing the filter medium such that filter cake is discharged. Discharge of the filter cake may be facilitated by introducing an underpressure into the diaphragm chamber 6, thereby exerting a suction force on the diaphragm 4 and lifting it up away from the discharge path of the filter cake.

The filter frame 2 is coupled to the filter plate 3 with a limited vertical travel. That is, when the filter chamber is closed and adjacent filter plate assemblies are pressed against each other, the filter frame 2 assumes the uppermost position of the limited travel, in which the seal bead 4a of the diaphragm is tightly pressed against the filter plate 3 (i.e. both the first seal lip 7 and the second seal lip 8 are engaged with the filter plate). This ensures, that a sufficient pressure may be introduced in the diaphragm chamber 6 so as to squeeze residual liquid contents from a filter cake. On the other hand, when the adjacent filter plate assemblies are retracted away from each other (i.e. when the filter chamber 5 is opened), the filter frame 2 gravitationally assumes a lowermost position of the limited travel, in which the frame is spaced apart from the filter plate 3, and the seal bead 4a is only slightly in contact with the filter plate (i.e. only the first seal lip 7 is engaged with the filter plate 3. This ensures that, when the filter chamber is opened) an accidental overpressurization of the diaphragm chamber 6 will leak into the surrounding environment, while enabling underpressurization to lift the diaphragm 4 and facilitate cake discharge.

Although the present disclosure is discussed above with reference to drawings illustrating an embodiment where the filtrate plate assembly is configured for a filter press having horizontal filter chambers, the present disclosure also encompasses embodiments arranged for other types of filter press configurations, such as filter presses having vertical filter chambers.

LIST OF REFERENCE NUMERALS 1 filter plate assembly
2 filter frame
2a open space
2b retainer groove
2c opening
3 filter plate
4 diaphragm
4a seal bead
4b retainer bead
4c lateral intermediate crest
5 filter chamber
6 diaphragm chamber
7 first seal lip
7a outer seal lip ridge
7b lateral outside crest
8 second seal lip
8a inner seal lip ridge
8b lateral inside crest
9a threaded pin
9b pin
10 stopper
11 sleeve

The invention claimed is:

1. A filter plate assembly for a filter press, comprising:
a filter frame defining a closed perimeter delimiting an open space,
a filter plate supported on the filter frame such that the filter plate extends over the open space,
a retainer groove provided on a side of the filter frame facing the filter plate, and
a diaphragm extending over the open space, and attached to the filter plate assembly, between the filter frame and the filter plate, the diaphragm further comprising:
   on a side facing the filter frame, a seal bead for sealing the diaphragm against the filter plate, and
   on a side facing the filter plate, a retainer bead received within the retainer groove, such that the diaphragm is retained in position between the filter frame and the filter plate,
wherein the filter frame forms a lateral wall of a filter chamber, when in use, wherein the seal bead comprises a first seal lip and a second seal lip,
wherein the first seal lip is vertically elevated from the second seal lip,
wherein the filter plate is arranged on the filter frame so as to allow a limited vertical travel of the filter frame with respect to the filter plate, such that the filter frame has:
   a lowermost position, in which only the first seal lip is in contact with the filter plate, and
   an uppermost position, in which both the first seal lip and the second seal lip are in contact with the filter plate.

2. The filter plate assembly according to claim 1, wherein a diaphragm chamber is formed between the filter plate and the diaphragm, on an inside of the seal bead,
wherein the filter plate assembly is configured such that, when the filter frame is in the lowermost position, the first seal lip:
   seals against a first pressure differential corresponding to a situation in which the diaphragm chamber is under-pressurized with respect to environmental pressure, so as to hold the diaphragm up, and
   leaks under a second pressure differential corresponding to a situation in which the diaphragm chamber is over-pressurized with respect to environmental pressure, so as to inflate the diaphragm,
wherein an absolute value of the first pressure differential is less than that of the second pressure differential.

3. The filter plate assembly according to claim 1, wherein the first seal lip is positioned laterally outside the second seal lip, and correspondingly, the second seal lip is arranged laterally inside the first seal lip.

4. The filter plate assembly according to claim 3, wherein the outer seal lip is configured to deform outwardly away from the filter plate-facing side of the diaphragm when a pressure is exerted thereon from a lateral outside, and to deform inwardly towards the filter plate-facing side of the diaphragm, when a pressure is exerted thereon from a lateral inside, and
wherein the inner seal lip is configured to deform outwardly away from the filter plate-facing side of the diaphragm when a pressure is exerted thereon from a lateral inside, and to deform inwardly towards the filter plate-facing side of the diaphragm, when a pressure is exerted thereon from a lateral outside.

5. The filter plate assembly according to claim 3, wherein the outer seal lip has a first asymmetric lateral rigidity, and the inner seal lip has a second asymmetric lateral rigidity,
wherein the inner seal lip has an increased lateral rigidity against a pressure exerted from a lateral inside with respect to a transversal rigidity of the inner seal lip against a pressure exerted from a lateral outside, and
wherein the outer seal lip has an increased lateral rigidity against a pressure exerted from a lateral outside with respect to a transversal rigidity of the outer seal lip against a pressure exerted from a lateral inside.

6. The filter plate assembly according to claim 3, wherein a cross-sectional profile of the outer seal lip defines an outer seal lip ridge between a lateral outside crest and a lateral intermediate crest, and a cross-sectional profile of the inner seal lip defines an inner seal lip ridge between a lateral inside crest and the lateral intermediate crest.

7. The filter plate assembly according to claim 6, wherein a portion of the cross-sectional profile of the inner seal lip, residing on a lateral outside of a vertical line running through a lateral centre point of the inner seal lip ridge along a direction perpendicular to a general plane of the diaphragm, occupies a greater space than a portion of the cross-sectional profile of the inner seal lip residing on the lateral inside of said line, and
in that a portion of the cross-sectional profile of the outer seal lip, residing on the lateral inside of a vertical line running through a lateral centre point of the outer seal lip ridge along the direction perpendicular to the general plane of the diaphragm, occupies a greater space than a portion of the outer seal lip residing on the lateral outside of said line.

8. The filter plate assembly according to claim 6, wherein the cross-sectional profile of the outer seal lip has a greater inclination between the lateral outside crest and the outer seal lip ridge than between the lateral intermediate crest and the outer seal lip ridge, and
in that the cross-sectional profile of the inner seal lip has a greater inclination between the lateral inside crest and the inner seal lip ridge than between the lateral intermediate crest and the inner seal lip ridge.

9. The filter plate assembly according to claim 6, wherein an inclination at which a lateral outside wall of the outer seal lip adjoins the ridge thereof is greater than an inclination at which a lateral inside wall of the outer seal lip adjoins the ridge thereof, and
in that an inclination at which a lateral inside wall of the inner seal lip adjoins the ridge thereof is greater than an inclination at which a lateral outside wall of the inner seal lip adjoins the ridge thereof.

10. The filter plate assembly according to claim 6, wherein the outer seal lip has a first height extending from the lateral intermediate crest outwardly from the filter plate-facing side of the diaphragm in a direction perpendicular to a general plane of the diaphragm, and the inner seal lip has a second height extending from the lateral intermediate crest outwardly from the filter plate-facing side of the diaphragm in the direction perpendicular to the general plane of the diaphragm, and
wherein the first height is at least 10% greater than the second height.

11. The filter plate assembly according to claim 6, wherein the outer seal lip has a first height extending from the lateral intermediate crest outwardly from the filter plate-facing side of the diaphragm in a direction perpendicular to a general plane of the diaphragm, and the inner seal lip has a second height extending from the lateral intermediate crest outwardly from the filter plate-facing side of the diaphragm in the direction perpendicular to the general plane of the diaphragm, and
wherein the second height is at least 30% of the first height.

12. The filter plate assembly according to claim 1, further comprising a plurality of pins protruding from the filter plate through openings provided in the filter frame,
wherein the pins are parallel with the limited travel of the filter frame, and
wherein at least one pin being provided with a stopper at a distal end thereof for limiting the lowermost position of the filter frame.

13. The filter plate assembly according to claim 12, wherein the pin provided with the stopper is equipped with a male thread at a distal end thereof, and
wherein the stopper is threadedly engaged with the threaded pin.

14. The filter plate assembly according to claim 12, wherein the pin equipped with the stopper is also equipped with a sleeve provided between the stopper and the filter plate,
wherein the sleeve protrudes through an opening corresponding to the associated pin, and
wherein the limited travel of the filter frame extends along the sleeve.

15. A filter press comprising a plurality of filter plate assemblies according to claim 1.

* * * * *